US012770053B2

(12) United States Patent
Chen et al.

(10) Patent No.: US 12,770,053 B2
(45) Date of Patent: Oct. 20, 2026

(54) SELECTING TRAINING NODES FOR TRAINING MACHINE-LEARNING MODELS IN A DISTRIBUTED COMPUTING ENVIRONMENT

(71) Applicant: RED HAT, INC., Raleigh, NC (US)

(72) Inventors: Huamin Chen, Westford, MA (US); Ricardo Noriega De Soto, Gorgonzola (IT)

(73) Assignee: Red Hat, Inc., Raleigh, NC (US)

( * ) Notice: Subject to any disclaimer, the term of this patent is extended or adjusted under 35 U.S.C. 154(b) by 1350 days.

(21) Appl. No.: 17/546,536

(22) Filed: Dec. 9, 2021

(65) Prior Publication Data

US 2023/0186143 A1 Jun. 15, 2023

(51) Int. Cl.
*G06N 20/20* (2019.01)
*G06N 20/00* (2019.01)

(52) U.S. Cl.
CPC .................................... *G06N 20/00* (2019.01)

(58) Field of Classification Search
CPC ........... G06N 3/098; G06N 3/08; G06N 20/00
See application file for complete search history.

(56) References Cited

U.S. PATENT DOCUMENTS

2021/0158216 A1 5/2021 Du et al.
2021/0304062 A1 9/2021 Rajamoni et al.
2022/0083917 A1* 3/2022 Ben-Itzhak ............ G06N 20/20
2022/0344049 A1* 10/2022 Hall ...................... G06F 9/5066
2023/0177402 A1* 6/2023 Goodsitt ................ G06N 20/20 706/12
2023/0385688 A1* 11/2023 Sun ........................ G06N 20/00

FOREIGN PATENT DOCUMENTS

CN 112862112 A 5/2021
CN 112906911 A 6/2021
CN 113392919 A 9/2021

OTHER PUBLICATIONS

Liu, Juncai et al., FedPA: An Adaptively Partial Model Aggregation Strategy in Federated Learning, Nov. 9, 2021, Computer Networks, vol. 199, p. 2 (Year: 2021).*

Sidahmed, Hakim et al., "Efficient and Private Federated Learning with Partially Trainable Networks", Nov. 8, 2021, arXiv. (Year: 2021).*

(Continued)

*Primary Examiner* — Hassan Mrabi

(74) *Attorney, Agent, or Firm* — Kilpatrick Townsend & Stockton LLP

(57) ABSTRACT

Training nodes can be selected for use in training a machine-learning model according to some aspects described herein. In one example, a system can receive performance-metric values generated by training nodes, where the training nodes are configured to generate the performance-metric values by implementing an evaluation phase in which the training nodes partially train models using first training data. The system can select a subset of the training nodes based on the performance-metric values. The system can then transmit commands to the subset of training nodes for causing the subset of training nodes to implement a training phase in which the subset of training nodes further train the models using second training data.

17 Claims, 7 Drawing Sheets

(56) References Cited

OTHER PUBLICATIONS

Jin, Y., et al., "Resource-Efficient and Convergence-Preserving Online Participant Selection in Federated Learning," IEEE 40th International Conference on Distributed Computing Systems, 2020.

Luo, B., et al., "Cost-Effective Federated Learning Design," IEEE Conference on Computer Communications, 2020, arXiv.2012.08336v1.

Wang, H., et al., "Job Scheduling for Large-Scale Machine Learning Clusters," Association for Computing Machinery, 2020, • https://engineering.virginia.edu/sites/default/files/common/departments/computer-science/files/Shen-JobSchedulerforML-CoNext2020.pdf.

Bonawitz, K., et al., "Towards Federated Learning At Scale: System Design," Proceedings of the 2nd SysML Conference, 2019, • https://arxiv.org/pdf/1902.01046.pdf.

* cited by examiner

SELECTING TRAINING NODES FOR TRAINING MACHINE-LEARNING MODELS IN A DISTRIBUTED COMPUTING ENVIRONMENT

TECHNICAL FIELD

The present disclosure relates generally to training machine-learning models in distributed computing environments. More specifically, but not by way of limitation, this disclosure relates to selecting training nodes for use in training machine-learning models in a distributed computing environment, such as a cloud computing environment or a computing cluster.

BACKGROUND

Federated learning is a process for training a machine-learning model across multiple nodes that have local training data, without exchanging the local training data among the nodes. Examples of the nodes can include edge devices such as Internet of Things (IOT) devices and servers. Each node trains its own local model using its own local training data, which may be different from the local training data stored on the other nodes. The nodes then share the parameters (e.g., the weights and biases) of their local models to generate a global model usable by all the nodes. For example, the nodes can transmit the parameters of their local models to a centralized aggregator node that can generate the global model based on the model parameters. The aggregator node can then provide each of the nodes with a copy of the global model or with access to the global model. This approach allows multiple nodes to cooperate to construct a common, robust machine-learning model without sharing their training data, which can address issues relating to data privacy, data security, and data access rights. Federated learning can be contrasted with traditional centralized machine-learning approaches, in which the nodes upload their local training data to a centralized server that then has access to all of the training data and can use the uploaded training data to train a model.

DETAILED DESCRIPTION

Figure 1:
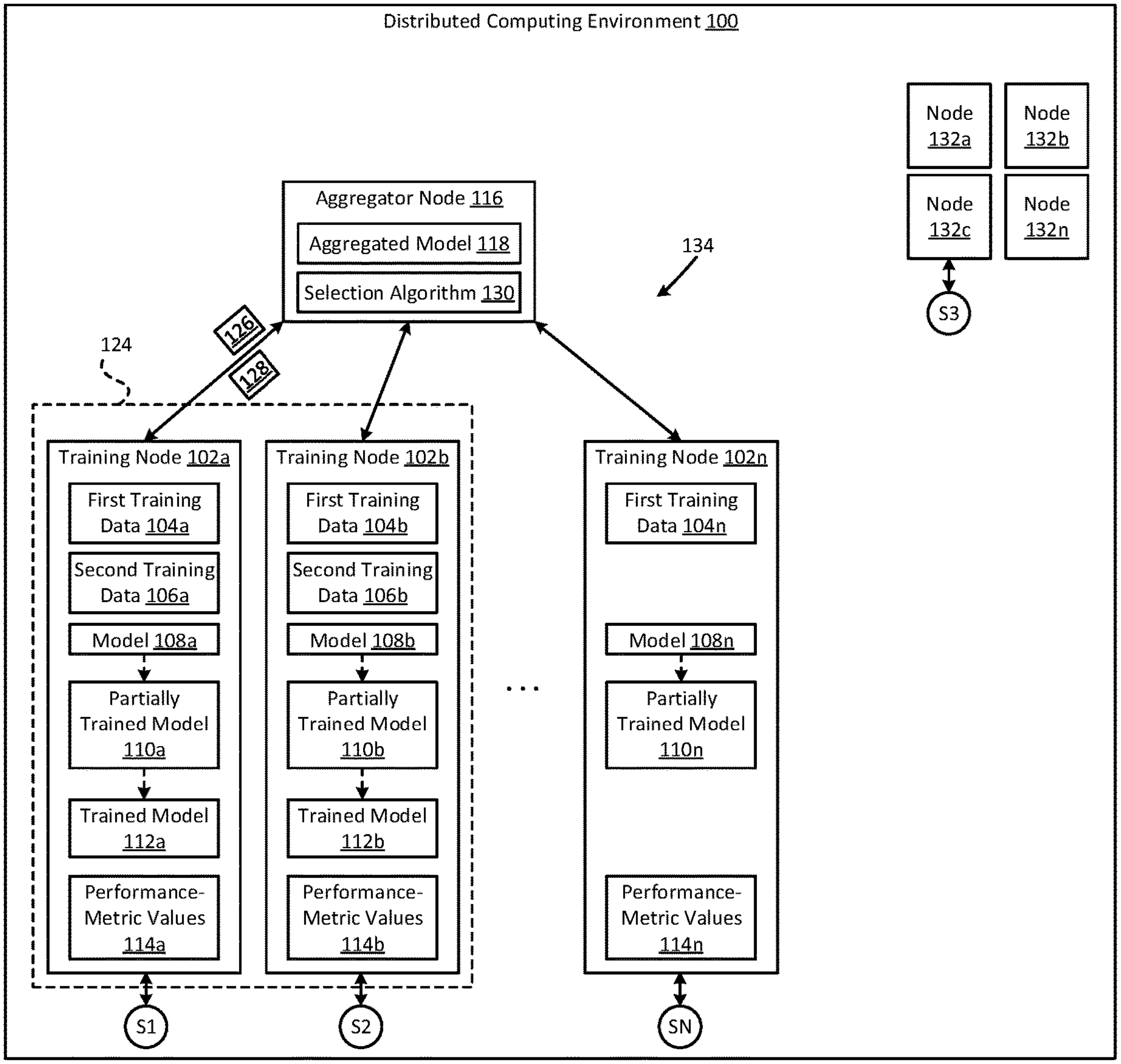
FIG. 1 shows a block diagram of an example of a distributed computing environment according to some aspects of the present disclosure.

A distributed computing environment can include nodes that may be subscribed to participate in a federated learning process. The nodes can register their intent to participate in the federated learning process with an aggregator node, which can then interact with the registered nodes to perform the federated learning process. Commonly, the nodes are heterogeneous in terms of their computing characteristics, such as their hardware, software, available computing resources, and power efficiency. For example, the nodes may include many different types of devices, such as various Internet of Things (IOT) devices and edge devices, that have markedly different computing characteristics than one another. Some of the nodes' computing characteristics may also change dynamically over time based on their computing loads. The heterogeneity among the nodes can negatively impact the speed, efficiency, and quality of the federated learning process. For example, the federated learning process may involve generating a global model based on the parameters of the local models trained on the nodes. But if the global model cannot be fully constructed until the model parameters are received from all nodes, and if the nodes train their local models at different speeds based on their computing characteristics, then the speed at which the global model can be constructed may be limited by the slowest node in the group. This can create bottlenecks and other inefficiencies in the federated learning process.

Some examples of the present disclosure can overcome one or more of the abovementioned problems by implementing an evaluation phase on the nodes to determine certain performance characteristics of the nodes. During the evaluation phase, each node can implement a partial training process to partially train a local model using first training data. Examples of the local model can include a neural network (e.g., a convolutional neural network or a recurrent neural network), a regression model, or a k-means model. The first training data used by each node can be local to that node. The nodes can then determine values for one or more performance metrics based on the partial training process and transmit the values to a central aggregator node. The aggregator node can receive the performance metric values and select a subset of the nodes for use in implementing a subsequent training phase. This selection can be made by executing a selection algorithm based on the performance metric values.

In some examples, the performance metrics can include resource-consumption metrics indicating how computing resources were consumed by a node as a result of the partial training process. Examples of resource-consumption metrics can include CPU or GPU consumption, memory consumption, storage consumption, and power consumption. Additionally or alternatively, the performance metrics can include model-performance metrics indicating the quality of a local model as a result of the partial training process. Examples of the model-performance metrics can include the accuracy, precision, recall, convergence rate, and error of a local model. Values for other types of performance metrics may also be determined during the evaluation phase.

As mentioned above, the aggregator node can select the subset of nodes based on the performance metric values. The aggregator node can then transmit commands to the selected subset of nodes for causing those nodes to implement the training phase. The training phase is distinct from the evaluation phase and can be implemented subsequent to the evaluation phase. The training phase can be a longer and more-fulsome training process that involves more training data than the evaluation phase. During the training phase, the nodes in the subset can further train their local models using second training data to generate trained models. The second training data used by each node can also be local to that node and can be distinct from the first training data used by that node. For example, the first training data can be a first part of a training dataset and the second training data can be a second part (e.g., a remainder) of the training dataset. By implementing the training phase, the subset of nodes can produce local models with a suitable level of training to be used in a federated learning process.

After generating the trained models, the subset of nodes can transmit the parameters of the trained models to the aggregator node for use by the aggregator node in generating an aggregated model. The aggregated model may serve as a "global model" in the federated learning process. The aggregator node may then provide the subset of nodes with copies of the aggregated model, or with access to the aggregated model, so that they can use the aggregated model to analyze target data, such as sensor measurements. Additionally or alternatively, the aggregator node may provide other nodes outside the subset with copies of the aggregated model, or with access to the aggregated model, so that they can use the aggregated model to analyze target data. Target data can be any data of interest that is to be analyzed. The target data analyzed by a given node may be local to that node.

The above process adds a new phase, the evaluation phase, to the federated learning process that can allow the aggregator node to make smarter decisions about which nodes to use for the more-fulsome training phase. During the evaluation phase, the nodes can use a relatively small set of training data and a relatively small number of training epochs to partially train the models, so that some preliminary values for the performance metrics can be computed. Given the smaller set of training data and the fewer training epochs, the values for these performance metrics can be computed relatively fast to help the aggregator node make more informed decisions about which nodes to include and exclude from the subsequent training phase. Through the evaluation phase, the aggregator node can filter out nodes that are suboptimal from a resource-consumption perspective or from a model-training perspective, to prevent those nodes from being used in the subsequent training phase. This can reduce or eliminate bottlenecks and inefficiencies in the federated learning process.

While some examples are described herein with reference to federated learning, the present disclosure is not intended to be limited to that context. Similar principles can apply to other situations and contexts in which multiple nodes are used (e.g., in a cooperative manner) to train one or more models in a distributed computing environment. Thus, the present disclosure is also intended to encompass those other situations and contexts.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a distributed computing environment 100 according to some aspects of the present disclosure. The distributed computing environment 100 may be a cloud computing environment, a data grid, a computing cluster, or any combination of these. The distributed computing environment 100 can include any number and combination of nodes, such as nodes 132*a-n* and training nodes 102*a-n*. Examples of the nodes can include servers and edge devices, such as IOT devices and wearable devices.

At least some of the nodes can subscribe to a federated learning system 134 configured to implement a federated learning process. For example, at least some of the nodes can register their intent to participate in the federated learning process with an aggregator node 116 or with another component of the distributed computing environment 100. Nodes that are registered to participate in the federated learning process can be referred to herein as training nodes, since they may be used to train local models 108*a-n*. The training nodes 102*a-c* may be subordinate to the aggregator node 116 in the federated learning system 134 and can perform certain operations in response to commands from the aggregator node 116, as described below.

The aggregator node 116 can determine which nodes in the distributed computing environment 100 are registered to participate in the federated learning process. For example, the aggregator node 116 can determine that the training nodes 102*a-n* are registered to participate and that nodes 132*a-n* are not registered to participate. The aggregator node 116 can then transmit a first set of commands, such as command 126, to the training nodes 102*a-n* for causing the training nodes 102*a-n* to implement an evaluation phase. The first set of commands may be transmitted to the training nodes 102*a-n* that are registered to participate in the federated learning process and not to any other nodes 132*a-n*.

Figure 2:
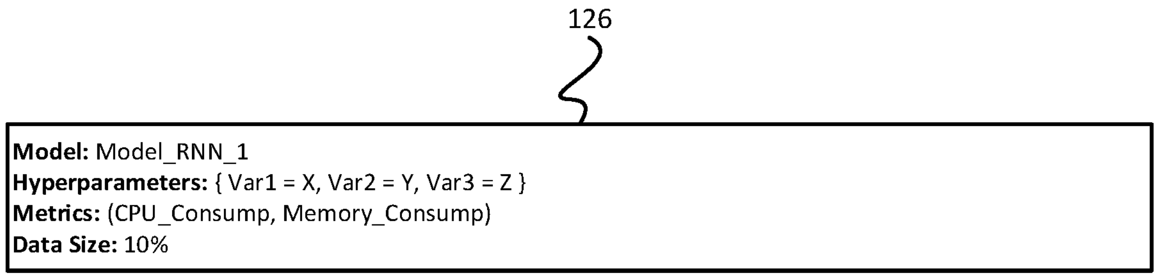
FIG. 2 shows an example of a command defining settings of an evaluation phase according to some aspects of the present disclosure.

The first set of commands can include settings for the evaluation phase. One example of such a command 126 is shown in FIG. 2. As shown, the command 126 can specify a specific model or a model type to be trained by the training nodes 102*a-n* during the evaluation phase. Examples of model types can include a convolutional neural network, a recurrent neural network, a support vector machine, and a K-nearest neighbors model. In this example, the command 126 specifies that the model to be used is named "Model_RNN_1," which is a specific type of recurrent neural network. The command 126 may additionally or alternatively specify one or more hyperparameter values. Examples of such hyperparameter values can include the number of layers and the number of nodes per layer for a neural network model; a regularization constant and kernel type for a support vector machine; and K for a K-nearest neighbors model. The hyperparameter values can be for the model, for a training algorithm to be applied during the evaluation phase, or for both of these. Examples of the hyperparameter values are represented in FIG. 2 as variable 1 ("Var1") having the value "X", hyperparameter variable 2 ("Var2") having the value "Y", and hyperparameter variable 3 ("Var3") having the value "Z."

In addition to the above, the command 126 can specify which performance metrics are to be determined by the training nodes 102*a-n*. In FIG. 2, the command 126 specifies that CPU consumption and memory consumption are to be determined based on the evaluation phase and returned to the aggregator node 116. Other examples of performance metrics that can be selected include power consumption, model accuracy, model convergence rate, and model error. The command 126 may further specify how much training data is to be used in the evaluation phase. The amount may be specified in absolute terms (e.g., 10,000 samples or 10 mini-batches) or relative terms (e.g., 15% of a larger training dataset). In FIG. 2, the command 126 specifies that 10% of a larger training dataset is to be used to partially train the models in the evaluation phase. It will be appreciated that although the command 126 shows a particular number and arrangement of settings, this is intended to be illustrative and non-limiting. Other examples may include more settings, fewer settings, different settings, or a different arrangement of settings than is shown in FIG. 2.

Returning to FIG. 1, the training nodes 102*a-n* can receive the first set of commands and responsively initiate an evaluation phase. Each of the training nodes 102*a-n* can perform its own evaluation phase that is independent of the evaluation phases performed on the other training nodes. During the evaluation phase, each training node can use first training data to partially train a local model to create a partially trained model. For example, training node 102*a* can use the first training data 104*a* to partially train the model 108*a* and thereby produce a partially trained model 110*a*. Training node 102*b* can use the first training data 104*b* to partially train the model 108*b* and thereby produce a partially trained model 110*b*. The first training data 104*b* can be different from the first training data 104*a*. And training node 102*n* can use the first training data 104*n* to partially train the model 108*n* and thereby produce a partially trained model 110*n*. The first training data 104*n* can be different from the first training data 104*a-b*.

The first training data 104*a-n* on the training nodes 102*a-n* can be labeled datasets usable to perform supervised training on the models 108*a-n*. The first training data on each of the training nodes 102*a-n* may be local to the training node and inaccessible to the other training nodes. Each set of first training data 104*a-n* can contain a relatively small amount of data (e.g., 5-10% of a larger training dataset) so that the evaluation phases can be implemented relatively quickly to allow for some preliminary performance-metrics to be collected.

As alluded to above, the training nodes 102*a-n* can configure and implement their evaluation phases based on the settings set forth in the first set of commands. For example, the training nodes 102*a-n* can extract the settings from the first set of commands. The training nodes 102*a-n* can then select the models 108*a-n* that are to be partially trained from among a group of candidate models or candidate model-types based on the extracted settings. Additionally or alternatively, the training nodes 102*a-n* can set the hyperparameter values for the model or the training process based on the extracted settings. Additionally or alternatively, the training nodes 102*a-n* can determine how much training data is to be included in the first training data 104*a-n* based on the extracted settings. For example, the training nodes 102*a-n* may each have their own training dataset from which a subset can be selected for use as the first training data 104*a-n*. The amount of data selected for use as the first training data 104*a-n* can depend on the settings in the first set of commands. Once various aspects of the evaluation phase are selected and configured based on the extracted settings, the training nodes 102*a-n* can execute the evaluation phases.

By executing the evaluation phases, the training nodes 102*a-n* can determine values for the performance metrics specified in the first set of commands. In particular, the training nodes 102*a-n* can determine the performance-metric values 114*a-n* based on the partial training process performed in the evaluation phase. Each of the training nodes 102*a-n* can determine (e.g., compute) its own performance-metric values associated with its own evaluation phase. For example, training node 102*a* can determine the performance-metric values 114*a*, training node 102*b* can determine the performance-metric values 114*b*, and training node 102*n* can determine the performance-metric values 114*n*. The performance-metric values 114*a-n* may be, for example, the amount of CPU consumption and memory consumption by the training nodes 102*a-n* as a result of the partial training during the evaluation phase.

In some examples, the performance metrics can include the hardware characteristics and software characteristics of the training nodes 102*a-n*, since those characteristics impact node performance. For example, the performance metrics can include hardware metrics such as processor types, quantities, capabilities, and speeds; memory types, quantities, capacities, and speeds; and storage types, quantities, capacities, and speeds associated with a training node. As another example, the performance metrics can include software metrics such as the number and types of running processes, the type and version of the operating system, and the training software on a training node.

After determining the performance-metric values 114*a-n*, the training nodes 102*a-n* can transmit the performance-metric values 114*a-n* to the aggregator node 116. The aggregator node 116 can then apply one or more selection algorithms 130 based on the performance-metric values 114*a-n* to select a subset 124 of the training nodes for use in a subsequent training phase. The subset 124 can consist of fewer than all of the training nodes 102*a-n* registered to participate in the federated learning system 134. Through this selection process, the number of training nodes 102*a-n* that participate in the training phase can be reduced.

The aggregator node 116 can execute the selection algorithms 130 to implement any number and combination of selection techniques. For example, the selection techniques can include comparing the performance-metric values 114*a-n* to a predefined threshold. For instance, the aggregator node 116 can compare the performance-metric values 114*a-n* to a predefined threshold to determine whether the performance-metric values 114*a-n* exceed the predefined threshold. The training nodes 102*a-b* that have performance-metric values 114*a-b* exceeding the predefined threshold may be included in the subset 124, and the remaining training nodes may be excluded from the subset 124. Other selection techniques may be more sophisticated. For example, the aggregator node 116 can generate scores for each training node 102*a-n* by applying weights to multiple values for multiple types of performance metrics. The aggregator node 116 can then compare the scores to a predefined threshold. The training nodes 102*a-b* that have scores exceeding the predefined threshold may be included in the subset 124, and the remaining training nodes may be excluded from the subset 124. Other selection techniques may also be used.

In some examples, the selection algorithms 130 can be used to assess the performance characteristics of the training nodes 102*a-n* relative to one another, rather than against absolute values or thresholds. For example, the selection algorithms 130 can be used to compare energy-consumption metrics associated with the training nodes 102*a-n* to one another. Based on this comparison, the training nodes 102*a-b* can be included in the subset 124 because they consumed less energy during the evaluation phase than a remainder of the training nodes. This can filter out training nodes that consume larger amounts of energy from the subsequent training phase. As another example, the selection algorithms 130 can be used to compare processor-consumption metrics or memory-consumption metrics associated with the training nodes 102*a-n* to one another. Based on this comparison, the training nodes 102*a-b* can be included in the subset 124 because they consumed less processing power or less memory during the evaluation phase than a remainder of the training nodes. This can filter out training nodes that consume large amounts of computing resources from the subsequent training phase. As still another example, the selection algorithms 130 can be used to compare hardware metrics associated with the training nodes 102*a-n* to one another. Based on this comparison, the training nodes 102*a-b* can be included in the subset 124 because they have more powerful hardware than a remainder of the training nodes. This can filter out training nodes are less powerful from the subsequent training phase. As yet another example, the selection algorithms 130 can be used to compare model-convergence rates associated with the training nodes 102*a-n* to one another. Based on this comparison, the training nodes 102*a-b* can be included in the subset 124 because their models converged at a faster rate than a remainder of the training nodes. This can filter out training nodes with models that train at a slower rate from the subsequent training phase. Performing this type of relative assessment, rather than an absolute assessment, can help ensure that at least one training node is always included in the subset 124.

After determining the subset 214 of training nodes, the aggregator node 116 can transmit a second set of commands, such as command 128, to the training nodes 102*a-b* in the subset 214. The second set of commands may be transmitted to the training nodes 102*a-b* in the subset 124 and not to any other nodes outside the subset 124, such as training node 102*n* and nodes 132*a-n*. The second set of commands can be configured to cause the training nodes 102*a-b* in the subset 124 to perform the training phase.

The training nodes 102*a-b* in the subset 124 can receive the second set of commands and responsively initiate the training phase. Each of the training nodes 102*a-n* can perform its own training phase that is independent of the training phases performed on the other training nodes. During the training phase, each training node can use second training data to further train its local model to create a trained model. For example, training node 102*a* can use the second training data 106*a* to further train the model 108*a* and thereby produce the trained model 112*a*. And training node 102*b* can use the second training data 106*b* to further train the model 108*b* and thereby produce the trained model 112*b*. The second training data 106*b* can be different from the second training data 106*a*. The second training data used by each training node may be local to the training node and inaccessible to the other training nodes. The second training data be a labeled dataset usable to perform supervised training on the model. By further training the models 112*a-b* in the training phase, the accuracy and performance thereof can be improved. Thus, the trained models 112*a-b* may have better accuracy and performance than the partially trained models 110*a-b* generated during the evaluation phase.

The second training data 106*a-b* can contain a relatively large amount of data as compared to the first training data 104*a-b*. For example, the second training data 106*a-b* can be two, three, four, five, six, seven, eight, nine, ten, or twenty times the size of the first training data 104*a-b*. This can allow the models 108*a-b* to be more comprehensively trained in the training phase than in the evaluation phase. In some examples in which the first training data 104*a-b* contains a subpart (e.g., 5-10%) of a larger training dataset, the second training data 106*a-b* may contain a remainder (e.g., 90-95%) of that larger training dataset.

Additionally or alternatively to using more training data, the training phase may involve more training epochs than the evaluation phase in some examples. A training epoch is a training cycle in which a complete pass is made through the training data. In the evaluation phase, a training epoch corresponds to a complete pass through the first training data. In the training phase, a training epoch corresponds to a complete pass through the second training data. By executing more training epochs in the training phase than in the evaluation phase, the models 108*a-b* may be trained in a more fulsome way that can improve accuracy and performance as compared to the evaluation phase.

Having generated the trained models 112*a-b*, the training nodes 102*a-n* can transmit parameters of the trained models 112*a-b* to the aggregator node 116. The parameters of the trained models 112*a-b* can be referred to as model parameters. The aggregator node 116 can then generate an aggregated model 118 based on the model parameters. For example, the aggregator node 116 can combine together the model parameters to generate the aggregated model 118. The aggregated model 118 may serve as a "global model" in the federated learning process.

In some examples, the aggregator node 117 can provide the training nodes 102*a-b* in the subset 124 with copies of the aggregated model 118, or with access to the aggregated model 118, so that they can use the aggregated model 118 to analyze target data. Additionally or alternatively, the aggregator node 116 may provide other nodes (e.g., training node 102*n* and nodes 132*a-n*) outside the subset 124 with copies of the aggregated model 118, or with access to the aggregated model 118, so that they can use the aggregated model 118 to analyze target data. The target data analyzed by a given node may be local to that node. One example of the target data can include sensor data, such as sensor measurements or images. The sensor data can be received from sensors S1-SN coupled to the nodes. Examples of the sensors S1-SN can include temperature sensors, pressure sensors, light sensors, gyroscopes, accelerometers, inclinometers, microphones, fluid sensors, gas sensors, cameras, laser scanners, global positioning system (GPS) units, ultrasonic transducers, or any combination of these. Through this process, the training nodes 102*a-b* can be used to train models 108*a-b* from which an aggregated model 118 can be derived for use by multiple nodes in analyzing their target data.

Although FIG. 1 shows a certain number and arrangement of components, this is for illustrative purposes and intended to be non-limiting. Other examples may include more components, fewer components, different components, or a different arrangement of the components than is shown in FIG. 1.

Figure 3:
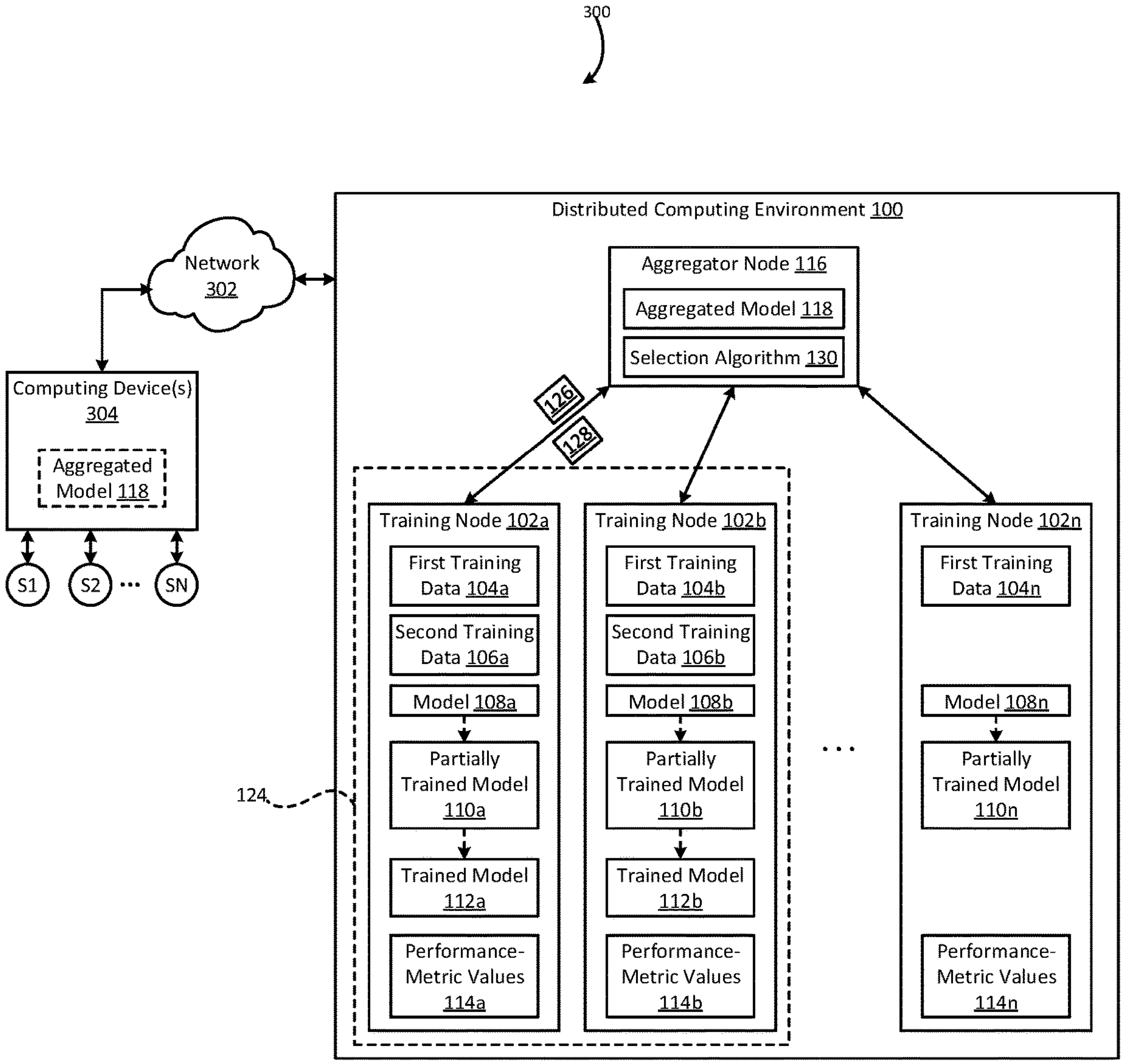
FIG. 3 shows a block diagram of an example of a system according to some aspects of the present disclosure.

Turning now to FIG. 3, FIG. 3 shows a block diagram of an example of a system 300 according to some aspects of the present disclosure. The system 300 includes a distributed computing environment 100 with an aggregator node 116 and training nodes 102*a-n*, which may function as described above. The system 300 also includes one or more computing devices 304 coupled to the distributed computing environment 100 via a network 302, such as the Internet. Examples of the computing devices 304 can include edge devices, wearable devices, servers, laptop computers, desktop computers, etc.

Rather than providing the aggregated model 118 to the training nodes 102*a-n*, in this example the aggregator node 116 can transmit the aggregated model 118 to the computing devices 304 over the network 302. Alternatively, the aggregator node 116 can provide the computing devices 304 with access to the aggregated model 118 via the network 302. In some such examples, the computing devices 304 may serve as clients in a client-server architecture, and the distributed computing environment 100 may serve as a server or service (e.g., a federated learning service) in the client-server architecture. Through this client-server architecture, the computing devices 304 can access the aggregated model 118 to analyze target data, such as sensor data. The computing devices 304 may collect the sensor data using sensors S1-SN coupled thereto. It will be appreciated that although FIG. 3 shows a certain number and arrangement of components, this is for illustrative purposes and intended to be non-limiting. Other examples may include more components, fewer components, different components, or a different arrangement of the components than is shown in FIG. 3.

Figure 4:
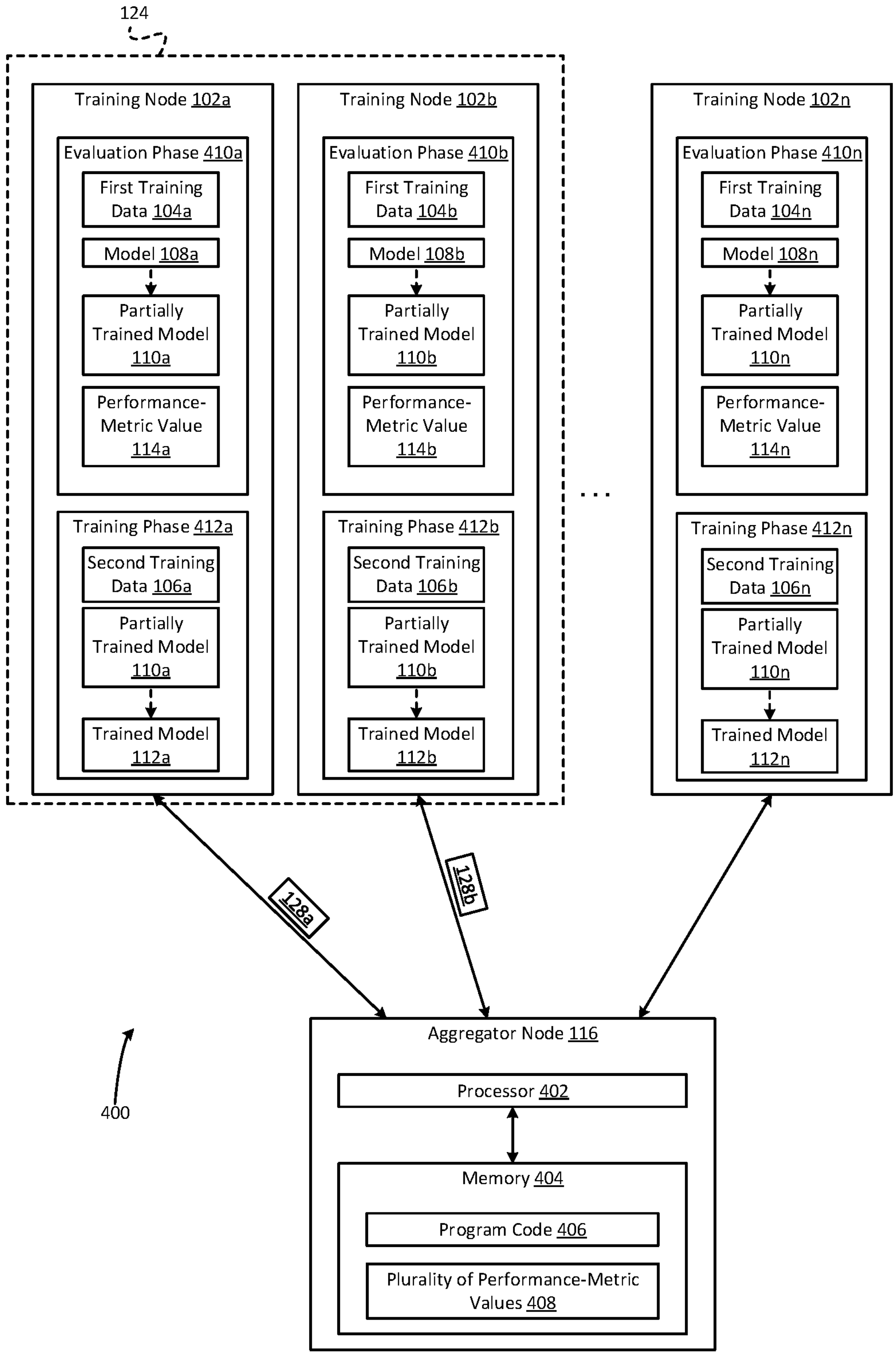
FIG. 4 shows a block diagram of an example of system that includes an aggregator node communicatively coupled to training nodes according to some aspects of the present disclosure.

Another example of system 400 is shown in FIG. 4. The system 400 includes an aggregator node 116 communicatively coupled to training nodes 102*a-n*. Each training node of the plurality of training nodes 102*a-n* can be configured to implement an evaluation phase 410*a-n* involving determining a respective performance-metric value 114*a-n* by partially training a respective model 108*a-n* using first training data 104*a-n*. And each training node of the plurality of training nodes 102*a-n* can be configured to implement a training phase 412*a-n* involving further training the respective model 108*a-n* using second training data 106*a-n*. In some examples, the first training data 104*a-n* may consist of less data than the second training data 106*a-n*. The training phase 412*a-n* is distinct from the evaluation phase 410*a-n* and is implemented subsequent to the evaluation phase 410*a-n*.

The aggregator node 116 can include a processor 402 communicatively coupled to a memory 404. The processor 402 can include one processing device or multiple processing devices. Non-limiting examples of the processor 402 include a Field-Programmable Gate Array (FPGA), an application-specific integrated circuit (ASIC), a microprocessor, etc. The processor 402 can execute program code 406 stored in the memory 404 to perform operations. In some examples, the program code 406 can include processor-specific instructions generated by a compiler or an interpreter from code written in any suitable computer-programming language, such as C, C++, C #, etc.

The memory 404 can include one memory device or multiple memory devices. The memory 404 can be non-volatile and may include any type of memory device that retains stored information when powered off. Examples of the memory 404 include electrically erasable and programmable read-only memory (EEPROM), flash memory, or any other type of non-volatile memory. At least some of the memory 404 includes a computer-readable medium from which the processor 402 can read program code 406. A computer-readable medium can include electronic, optical, magnetic, or other storage devices capable of providing the processor 402 with computer-readable instructions or other program code. Examples of a computer-readable medium include magnetic disks, memory chips, ROM, random-access memory (RAM), an ASIC, a configured processor, optical storage, or any other medium from which a computer processor can read the program code 406.

In some examples, the processor 402 of the aggregator node 116 can perform operations by executing the program code 406. For example, the processor 402 can receive a plurality of performance-metric values 408 generated by each training node of the plurality of training nodes 102*a-n* in the evaluation phase 410*a-n*. The processor 402 can select a subset 124 of training nodes from among the plurality of training nodes 102*a-n* based on the respective performance-metric value 114*a-n* from each training node of the plurality of training nodes 102*a-n*. The processor 402 can then transmit a set of commands 128*a-b* to the subset 124 of training nodes for causing the subset 124 of training nodes to implement the training phase 412*a-b* and thereby generate trained models 112*a-b*. Because the commands 128*a-b* were not transmitted to the training node 102*n* in this example, the training node 102*n* would not execute its training phase 412*n*.

Figure 5:
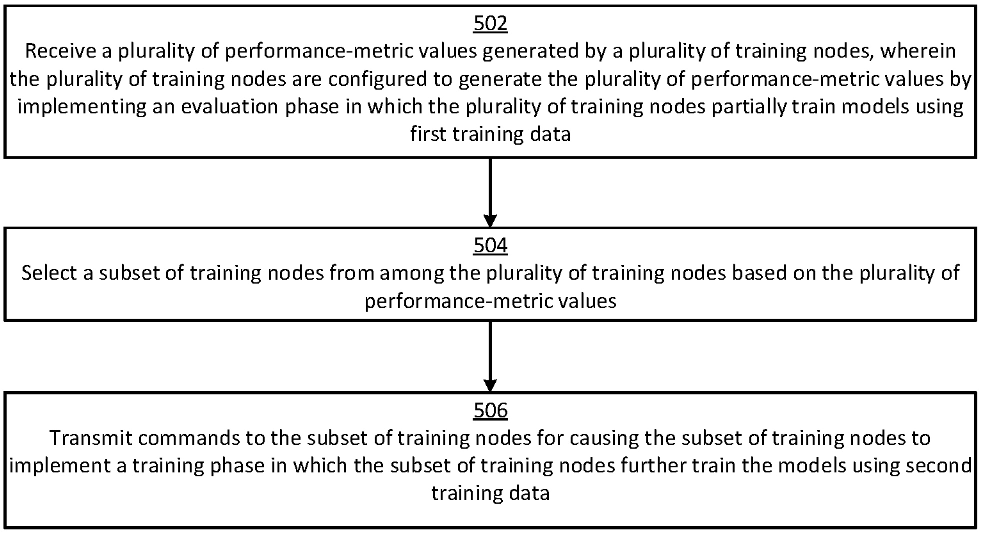
FIG. 5 shows a flow chart of an example of a process capable of being implemented by an aggregator node according to some aspects of the present disclosure.

In some examples, the processor 402 of the aggregator node 116 can execute the operations shown in FIG. 5. Other examples may include more operations, fewer operations, different operations, or a different order of the operations than are shown in FIG. 5. The operations of FIG. 5 below are described with reference to the components of FIG. 4 described above.

In block 502, the processor 402 receives a plurality of performance-metric values 408 generated by a plurality of training nodes 102*a-n*. The plurality of training nodes 102*a-n* are configured to generate the plurality of performance-metric values 408 by implementing an evaluation phase 410*a-n* in which the plurality of training nodes 102*a-n* partially train models 108*a-n* using first training data 104*a-n*.

In block 504, the processor 402 selects a subset 124 of training nodes from among the plurality of training nodes 102*a-n* based on the plurality of performance-metric values 408. The processor 402 can make this selection by executing one or more selection algorithms, such as the selection algorithms 130 described above with respect to FIG. 1.

In block 506, the processor 402 transmits commands 128*a-n* to the subset 124 of training nodes for causing the subset 124 of training nodes to implement a training phase 412*a-b*, in which the subset 124 of training nodes further train the models 108*a-n* (e.g., the partially trained models 110*a-b*) using second training data 106*a-b*. The first training data 104*a* and the second training data 106*a* can both be subparts of a training dataset stored on the training node 102*a*, where the first training data 104*a* can contain fewer observations than the second training data 106*a*.

Figure 6:
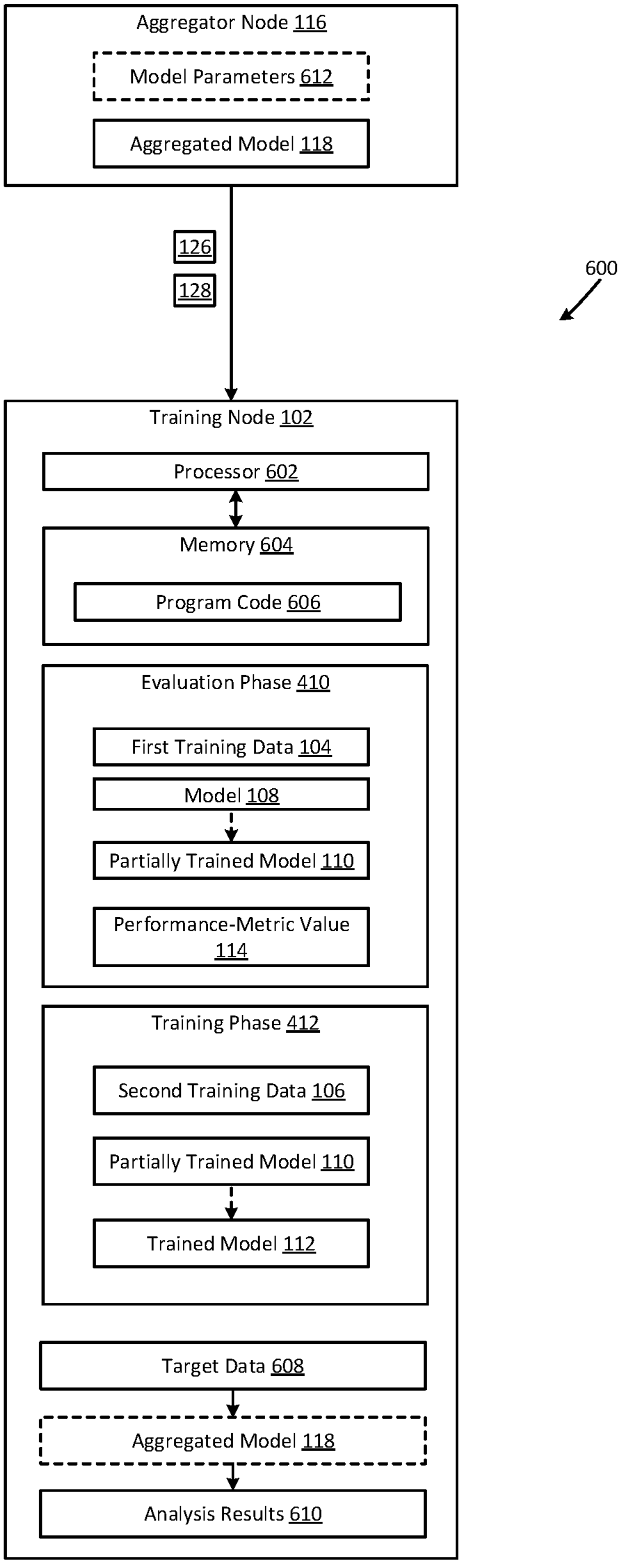
FIG. 6 shows a block diagram of an example of a system that includes a training node communicatively coupled to an aggregator node according to some aspects of the present disclosure.

FIG. 6 shows a block diagram of an example of a system 600 that includes a training node 102 communicatively coupled to an aggregator node 116 according to some aspects of the present disclosure. The training node 102 and the aggregator node 116 can generally function as described above.

The training node 102 can include a processor 602 communicatively coupled to a memory 604. The processor 602 can include one processing device or multiple processing devices. Non-limiting examples of the processor 602 include a Field-Programmable Gate Array (FPGA), an application-specific integrated circuit (ASIC), a microprocessor, etc. The processor 602 can execute program code 606 stored in the memory 604 to perform operations. In some examples, the program code 606 can include processor-specific instructions generated by a compiler or an interpreter from code written in any suitable computer-programming language, such as C, C++, C #, etc.

The memory 604 can include one memory device or multiple memory devices. The memory 604 can be non-volatile and may include any type of memory device that retains stored information when powered off. Examples of the memory 604 include electrically erasable and programmable read-only memory (EEPROM), flash memory, or any other type of non-volatile memory. At least some of the memory 604 includes a computer-readable medium from which the processor 602 can read program code 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the program code 606.

In some examples, the processor 602 of the training node 102 can perform operations by executing the program code 606. For example, the processor 602 can receive a first command, such as command 126, from the aggregator node 116. In response to receiving the first command, the training node 102 can execute an evaluation phase 410 in which a model 108 is partially trained using first training data 104. The processor 602 can then determine a performance-metric value 114 based on the partial training. The performance-metric value 114 may indicate, for example, resource consumption or model performance associated with the evaluation phase 410. The processor 602 can then transmit the performance-metric value 114 to the aggregator node 116.

At a later point in time, the processor 602 of the training node 102 can receive a second command, such as command 128, from the aggregator node 116. In response to receiving the second command, the training node 102 can execute a training phase 412 involving further training the model 108 (e.g., the partially trained model 110) using second training data 106 to generate a trained model 112.

In some examples, the processor 602 can transmit the trained model 112 or its model parameters 612 to the aggregator node 116 for use in generating an aggregated model 118. The aggregator node 116 can then provide the aggregated model 118 back to the training node 102 for use in analyzing target data 608 to generate analysis results 610. Examples of the target data can include sensor data or transactional data.

Figure 7:
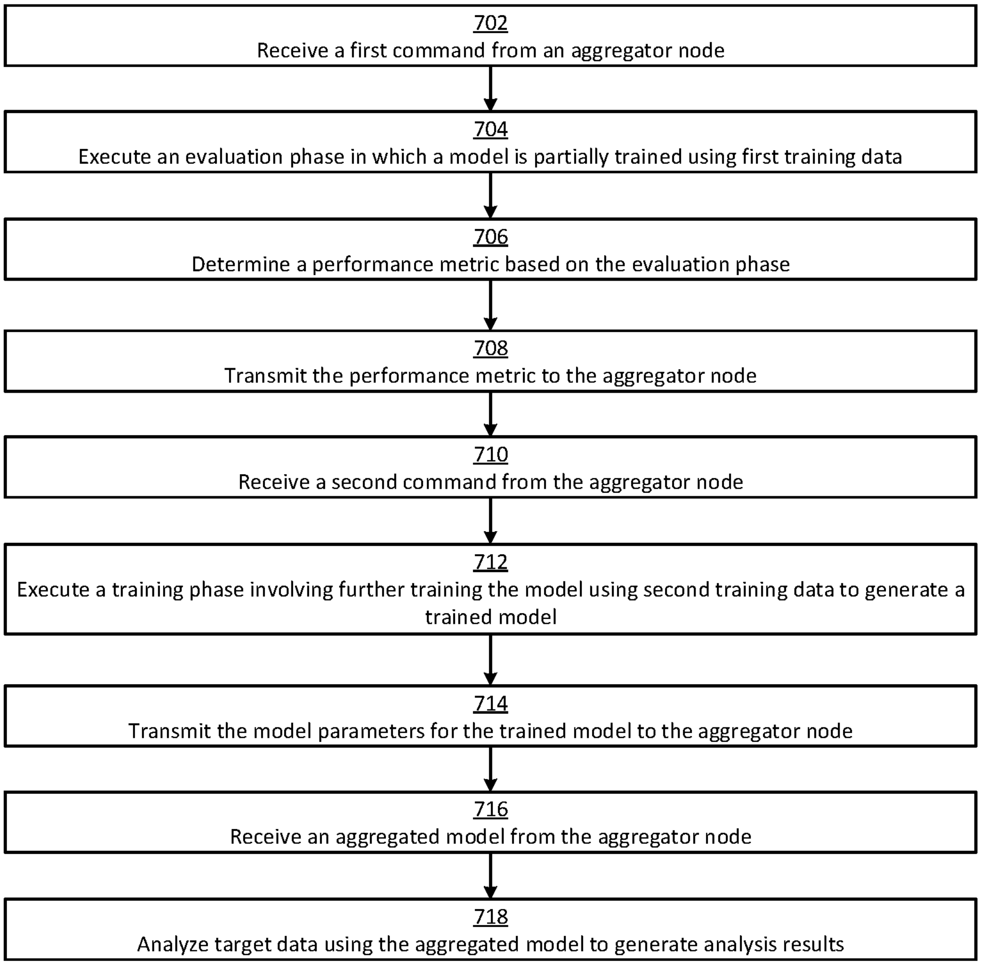
FIG. 7 shows a flow chart of another example of a process capable of being implemented by a training node according to some aspects of the present disclosure.

In some examples, the processor 602 of the training node 102 can execute the operations shown in FIG. 7. Other examples may include more operations, fewer operations, different operations, or a different order of the operations than are shown in FIG. 7. The operations of FIG. 7 below are described with reference to the components of FIG. 5 described above.

In block 702, a processor 602 of a training node 102 receives a first command, such as command 126, from the aggregator node 116. For example, the aggregator node 116 can transmit the first command over a network to the processor 602. The network may be a local area network or a wide area network that communicatively couples the training nodes to the aggregator node 116 in a distributed computing environment.

In block 704, the processor 602 executes an evaluation phase 410 in which a model 108 is partially trained using first training data 104. The processor 602 can execute the evaluation phase 410 in response to receiving the first command.

In block 706, the processor 602 determines a performance-metric value 114 based on the evaluation phase 410. The performance-metric value 114 may indicate, for example, resource consumption or model performance associated with the evaluation phase 410.

In block 708, the processor 602 transmits the performance-metric value 114 to the aggregator node 116. For example, the processor 602 can transmit the performance-metric value 114 over the network to the aggregator node 116.

In block 710, the processor 602 receives a second command, such as command 128, from the aggregator node 116. For example, the aggregator node 116 can transmit the second command over the network to the processor 602. The second command may be different from the first command.

In block 712, the processor 602 executes a training phase 412 involving further training the model 108 (e.g., the partially trained model 110) using second training data 106 to generate a trained model 112. The processor 602 can execute the training phase in response to receiving the second command.

In block 714, the processor 602 transmits the model parameters 612 for the trained model 112 to the aggregator node 116 for use in generating an aggregated model 118. For example, the processor 602 can transmit the model parameters 612 over the network to the aggregator node 116. The aggregator node 116 can generate the aggregated model 118 based on at least two sets of model parameters received from at least two training nodes 102.

In block 716, the processor 602 receives the aggregated model 118 from the aggregator node 116. For example, the aggregator node 116 can transmit the aggregated model 118 over the network to the processor 602.

In block 718, the processor 602 analyzes target data 608 using the aggregated model 118 to generate analysis results 610. The target data 608 can be local to the training node 102 and inaccessible to other training nodes in the distributed computing environment.

In some aspects, training nodes can be selected for training machine-learning models in a distributed computing environment according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: receive a plurality of performance-metric values from a plurality of training nodes configured to generate the plurality of performance-metric values by implementing an evaluation phase in which the plurality of training nodes partially train models using first training data; select a subset of training nodes from among the plurality of training nodes based on the plurality of performance-metric values; and transmit commands to the subset of training nodes for causing the subset of training nodes to implement a training phase in which the subset of training nodes further train the models using second training data.

Example #2: The non-transitory computer-readable medium of Example #1, wherein the commands are a second set of commands, and further comprising program code that is executable by the one or more processors to transmit a first set of commands to the plurality of training nodes prior to transmitting the second set of commands to the subset of training nodes, wherein the first set of commands are configured to cause each training node of the plurality of training nodes to implement the evaluation phase for generating a respective performance-metric value among the plurality of performance-metric values.

Example #3: The non-transitory computer-readable medium of Example #2, wherein the first set of commands specify a model to be trained during the evaluation phase and a hyperparameter value for use during the evaluation phase.

Example #4: The non-transitory computer-readable medium of Example #3, wherein the hyperparameter value is for the model.

Example #5: The non-transitory computer-readable medium of Example #3, wherein the hyperparameter value is for a training algorithm usable to train the model.

Example #6: The non-transitory computer-readable medium of any of Examples #2-5, wherein the first training data is a subset of the second training data, and wherein the first set of commands indicate how much of the second training data is to be used as the first training data.

Example #7: The non-transitory computer-readable medium of any of Examples #2-6, wherein the performance-metric values are values for a performance metric, and wherein the first set of commands specify the performance metric for which the values are to be computed.

Example #8: The non-transitory computer-readable medium of any of Examples #1-7, wherein the performance-metric values are values for a performance metric, and wherein the performance metric is a model-performance metric or a resource-consumption metric.

Example #9: The non-transitory computer-readable medium of any of Examples #1-8, further comprising program code that is executable by the one or more processors for causing the one or more processors to select the subset of training nodes by applying a selection algorithm to the performance-metric values.

Example #10: A system comprising a plurality of training nodes, each training node of the plurality of training nodes being configured to implement an evaluation phase involving determining a respective performance-metric value by partially training a respective model using first training data. Each training node of the plurality of training nodes can be configured to implement a training phase involving further training the respective model using second training data. The training phase can be distinct from the evaluation phase and configured to be implemented subsequent to the evaluation phase. The first training data can consist of less data than the second training data. The system can also comprise an aggregator node communicatively coupled to the plurality of training nodes. The aggregator node can include one or more processors and one or more memories, the one or more memories including program code that is executable by the one or more processors for causing the one or more processors to: receive the respective performance-metric value generated by each training node of the plurality of training nodes in the evaluation phase; select a subset of training nodes from among the plurality of training nodes based on the respective performance-metric value from each training node of the plurality of training nodes; and transmit a set of commands to the subset of training nodes for causing the subset of training nodes to implement the training phase and thereby generate trained models.

Example #11: The system of Example #10, wherein the set of commands is a second set of commands, and wherein the one or more memories further include program code that is executable by the one or more processors for causing the one or more processors to transmit a first set of commands to the plurality of training nodes prior to transmitting the second set of commands to the subset of training nodes, wherein the first set of commands are configured to cause each training node of the plurality of training nodes to implement the evaluation phase for generating the respective performance-metric value.

Example #12: The system of Example #11, wherein the first set of commands specify a model to be trained during the evaluation phase and a hyperparameter value for use during the evaluation phase.

Example #13: The system of Example #12, wherein the hyperparameter value is for the model.

Example #14: The system of Example #12, wherein the hyperparameter value is for a training algorithm usable to train the model.

Example #15: The system of any of Examples #11-14, wherein the one or more memories further include program code that is executable by the one or more processors for causing the one or more processors to: determine that the plurality of training nodes are subscribed to participate in a federated-learning service; and transmit the first set of commands to the plurality of training nodes based on determining that the plurality of training nodes are subscribed to participate in a federated-learning service.

Example #16: The system of any of Examples #10-15, wherein the plurality of training nodes are configured to provide parameters of the trained models to the aggregator node, and wherein the one or more memories further include program code that is executable by the one or more processors for causing the one or more processors to: receive the parameters of the trained models from the plurality of training nodes; generate an aggregated model based on the parameters; and provide one or more computing devices with access to the aggregated model for use in analyzing sensor data.

Example #17: A method comprising: receiving, by one or more processors, a plurality of performance-metric values generated by a plurality of training nodes, wherein the plurality of training nodes are configured to generate the plurality of performance-metric values by implementing an evaluation phase in which the plurality of training nodes partially train models using first training data; selecting, by the one or more processors, a subset of training nodes from among the plurality of training nodes based on the plurality of performance-metric values; and transmitting, by the one or more processors, commands to the subset of training nodes for causing the subset of training nodes to implement a training phase in which the subset of training nodes further train the models using second training data.

Example #18: The method of Example #17, wherein the commands are a second set of commands, and further comprising transmitting a first set of commands to the plurality of training nodes prior to transmitting the second set of commands to the subset of training nodes, wherein the first set of commands are configured to cause each training node of the plurality of training nodes to implement the evaluation phase for generating a respective performance-metric value among the plurality of performance-metric values.

Example #19: The method of Example #18, wherein the first set of commands specify a model to be trained during the evaluation phase and a hyperparameter value for use during the evaluation phase.

Example #20: The method of any of Examples #18-19, wherein the first training data is a subset of the second training data, and wherein the first set of commands indicate how much of the second training data is to be used as the first training data.

Example #21: A system comprising: one or more processors; and one or more memories comprising program code that is executable by the one or more processors for causing the one or more processors to: receive a plurality of performance-metric values generated by a plurality of training nodes, wherein the plurality of training nodes are configured to generate the plurality of performance-metric values by implementing an evaluation phase in which the plurality of training nodes partially train models using first training data; select a subset of training nodes from among the plurality of training nodes based on the plurality of performance-metric values; and transmit commands to the subset of training nodes for causing the subset of training nodes to implement a training phase in which the subset of training nodes further train the models using second training data, the training phase being distinct from the evaluation phase and configured to be implemented subsequent to the evaluation phase.

Example #22: The system of Example #21, wherein the commands are a second set of commands, and wherein the one or more memories further comprise program code that is executable by the one or more processors to transmit a first set of commands to the plurality of training nodes prior to transmitting the second set of commands to the subset of training nodes, wherein the first set of commands are configured to cause each training node of the plurality of training nodes to implement the evaluation phase and thereby generate a respective performance-metric value among the plurality of performance-metric values.

Example #23: The system of Example #22, wherein the first set of commands specify a model to be trained during the evaluation phase and a hyperparameter value for use during the evaluation phase.

Example #24: The system of Example #23, wherein the hyperparameter value is for the model.

Example #25: The system of Example #23, wherein the hyperparameter value is for a training algorithm.

Example #26: The system of any of Examples #22-25, wherein the first training data is a subset of the second training data, and wherein the first set of commands indicates how much of the second training data is to be used as the first training data.

Example #27: The system of any of Examples #22-26, wherein the performance-metric values are values for a performance metric, and wherein the first set of commands specify the performance metric for which the values are to be computed.

Example #28: The system of Example #27, wherein the performance metric is a processor-consumption metric, a memory-consumption metric, or an energy-consumption metric.

Example #29: The system of any of Examples #21-28, further comprising program code that is executable by the one or more processors for causing the one or more processors to select the subset of training nodes by comparing the performance-metric values to a predefined threshold.

Example #30: A system comprising: means for receiving a plurality of performance-metric values generated by a plurality of training nodes, wherein the plurality of training nodes are configured to generate the plurality of performance-metric values by implementing an evaluation phase in which the plurality of training nodes partially train models using first training data; means for selecting a subset of training nodes from among the plurality of training nodes based on the plurality of performance-metric values; and means for transmitting commands to the subset of training nodes for causing the subset of training nodes to implement a training phase in which the subset of training nodes further train the models using second training data, the training phase being distinct from the evaluation phase.

Example #31: A training node of a distributed computing environment, the training node comprising: one or more processors; and one or more memories comprising program code that is executable by the one or more processors for causing the one or more processors to: receive a first command from an aggregator node; in response to the first command: execute an evaluation phase in which a model is partially trained using first training data; determine a performance-metric value indicating resource consumption or model performance associated with the evaluation phase; and transmit the performance-metric value to the aggregator node; subsequent to transmitting the performance-metric value to the aggregator node, receive a second command from the aggregator node; and in response to receiving the second command, execute a training phase involving further training the model using second training data to generate a trained model.

Example #32: The training node of Example #31, wherein the first command specifies the model to be trained and a hyperparameter for use during the evaluation phase.

Example #33: The training node of any of Examples #31-32, wherein the one or more memories further comprise program code that is executable by the one or more processors to transmit parameters of the trained model to the aggregator node, the aggregator node being configured to combine the parameters of the trained model with other parameters of another trained model from another training node of the distributed computing environment to create an aggregated model, and aggregator node further being configured to provide the training node with access to the aggregated model.

Example #34: The training node of Example #33, wherein the one or more memories further comprise program code that is executable by the one or more processors to: receive the aggregated model from the aggregator node; and apply the aggregated model to sensor data.

Example #35: The training node of any of Examples #31-34, wherein the training node is an edge device.

Example #36: A method comprising: receiving, by one or more processors of a training node, a first command from an aggregator node; in response to the first command: executing, by the one or more processors, an evaluation phase execute an valuation phase in which a model is partially trained using first training data; determining, by the one or more processors, a performance-metric value indicating resource consumption or model performance associated with the evaluation phase; and transmitting, by the one or more processors, the performance-metric value to the aggregator node; subsequent to transmitting the performance-metric value to the aggregator node, receiving, by the one or more processor, a second command from the aggregator node; and in response to receiving the second command, executing, by the one or more processors, a training phase involving further training the model using second training data to generate a trained model.

Example #37: A system comprising: one or more processors; and one or more memories comprising program code that is executable by the one or more processors for causing the one or more processors to: receive a first command from a remote computing device; in response to the first command: execute an evaluation phase in which a model is partially trained using first training data; determine a performance metric indicating resource consumption or model performance associated with the evaluation phase; and transmit the performance metric to the remote computing device; subsequent to transmitting the performance metric to the remote computing device, receive a second command from the remote computing device; and in response to receiving the second command, execute a training phase involving further training the model using second training data to generate a trained model.

Example #38: The system of Example #37, wherein the remote computing device is an aggregator node.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising program code that is executable by one or more processors of an aggregator node for causing the aggregator node to:

transmit a first set of commands to a plurality of training nodes that are registered to participate in a federated learning process, each respective training node of the plurality of training nodes being a respective computing device with a respective processor and a respective memory, wherein the first set of commands instructs the plurality of training nodes to execute an evaluation phase in which each training node of the plurality of training nodes partially trains a local model using first local training data and measures a local performance of the training node during the evaluation phase;

after transmitting the first set of commands to the plurality of training nodes, receive a plurality of performance-metric values from the plurality of training nodes, wherein each performance-metric value of the plurality of performance-metric values indicates the local performance of a respective training node of the plurality of training nodes during the evaluation phase;

select a subset of training nodes from among the plurality of training nodes subscribed to participate in the federated learning process, wherein the subset of training nodes is selected based on a corresponding subset of the plurality of performance-metric values indicating that the local performance of each training node in the subset of training nodes satisfies a performance criterion; and based on selecting the subset of training nodes, transmit a second set of commands to the subset of training nodes, wherein the second set of commands instructs the subset of training nodes to implement a training phase in which each respective training node in the subset of training nodes further trains its local model using second local training data that contains a larger amount of training data than the first local training data, wherein the second set of commands is only transmitted to the selected subset of training nodes and not a remainder of the training nodes in the plurality of training nodes.

2. The non-transitory computer-readable medium of claim 1, wherein the first set of commands specify a model to be trained during the evaluation phase and a hyperparameter value for use during the evaluation phase.

3. The non-transitory computer-readable medium of claim 2, wherein the hyperparameter value is for the model.

4. The non-transitory computer-readable medium of claim 2, wherein the hyperparameter value is for a training algorithm usable to train the model.

5. The non-transitory computer-readable medium of claim 1, wherein the first local training data is a subset of the second local training data, and wherein the first set of commands indicate how much of the second local training data is to be used as the first local training data.

6. The non-transitory computer-readable medium of claim 1, wherein the plurality of performance-metric values are values for a particular performance metric, and wherein the first set of commands specify the particular performance metric to be measured by the training nodes during the evaluation phase.

7. The non-transitory computer-readable medium of claim 1, wherein the plurality of performance-metric values are values for a particular performance metric, and wherein the particular performance metric is a model-performance metric or a resource-consumption metric.

8. The non-transitory computer-readable medium of claim 1, further comprising program code that is executable by the one or more processors for causing the one or more processors to select the subset of training nodes by applying a selection algorithm to the plurality of performance-metric values.

9. A system comprising:

a plurality of training nodes that are registered to participate in a federated learning process, each training node of the plurality of training nodes being a respective computing device with a respective processor and a respective memory, and each training node of the plurality of training nodes being configured to implement an evaluation phase involving partially training a respective local model using first local training data and measuring a local performance of the training node during the evaluation phase, and each training node of the plurality of training nodes being configured to implement a training phase involving further training the respective local model using second local training data that contains a larger amount of training data than the first local training data, the training phase being distinct from the evaluation phase and configured to be implemented subsequent to the evaluation phase; and an aggregator node communicatively coupled to the plurality of training nodes, the aggregator node including one or more processors and one or more memories, the one or more memories including program code that is executable by the one or more processors for causing the one or more processors to:

transmit a first set of commands to the plurality of training nodes that are registered to participate in the federated learning process, wherein the first set of commands instruct the plurality of training nodes to execute the evaluation phase;

after transmitting the first set of commands to the plurality of training nodes, receive a plurality of performance-metric values generated by the plurality of training nodes, wherein each performance-metric value of the plurality of performance-metric values indicates the local performance of a respective training node of the plurality of training nodes during the evaluation phase;

select a subset of training nodes from among the plurality of training nodes subscribed to participate in the federated learning process, wherein the subset of training nodes is selected based on a corresponding subset of the plurality of performance-metric values indicating that the local performance of each training node in the subset of training nodes satisfies a performance criterion; and based on selecting the subset of training nodes, transmit a second set of commands to the subset of training nodes, wherein the second set of commands instructs each training node in the subset of training nodes to implement the training phase and thereby further train its respective local model using the second local training data, wherein the second set of commands is only transmitted to the selected subset of training nodes and not a remainder of the training nodes in the plurality of training nodes.

10. The system of claim 9, wherein the first set of commands specify a model to be trained during the evaluation phase and a hyperparameter value for use during the evaluation phase.

11. The system of claim 10, wherein the hyperparameter value is for the model.

12. The system of claim 10, wherein the hyperparameter value is for a training algorithm usable to train the model.

13. The system of claim 9, wherein the one or more memories further include program code that is executable by the one or more processors for causing the one or more processors to:

prior to transmitting the first set of commands to the plurality of training nodes, determine that the plurality of training nodes are subscribed to participate in the federated learning process; and based on determining that the plurality of training nodes are subscribed to participate in the federated learning process, transmit the first set of commands to the plurality of training nodes to initiate the evaluation phase on the plurality of training nodes.

14. The system of claim 9, wherein the subset of training nodes are each configured to provide a respective set of parameters for its local model to the aggregator node following the training phase, and wherein the one or more memories further include program code that is executable by the one or more processors for causing the one or more processors to:

receive the respective set of parameters for the local model from each training node in the subset of training nodes;

generate an aggregated model based on the respective set of parameters received from each training node in the subset of training nodes; and provide one or more computing devices with access to the aggregated model for use in analyzing sensor data.

15. A method comprising:

transmitting, by one or more processors, a first set of commands to a plurality of training nodes that are registered to participate in a federated learning process, each respective training node of the plurality of training nodes being a respective computing device with a respective processor and a respective memory, wherein the first set of commands instructs the plurality of training nodes to execute an evaluation phase in which each training node of the plurality of training nodes partially trains a local model using first local training data and measures a local performance of the training node during the evaluation phase;

after transmitting the first set of commands to the plurality of training nodes, receiving, by the one or more processors, a plurality of performance-metric values generated by the plurality of training nodes, wherein each performance-metric value of the plurality of performance-metric values indicates the local performance of a respective training node of the plurality of training nodes during the evaluation phase;

selecting, by the one or more processors, a subset of training nodes from among the plurality of training nodes subscribed to participate in the federated learning process, wherein the subset of training nodes is selected based on a corresponding subset of the plurality of performance-metric values indicating that the local performance of each training node in the subset of training nodes satisfies a performance criterion; and based on selecting the subset of training nodes, transmitting, by the one or more processors, a second set of commands to the subset of training nodes, wherein the second set of commands instructs the subset of training nodes to implement a training phase in which each respective training node in the subset of training nodes further trains its local model using second local training data that contains a larger amount of training data than the first local training data, wherein the second set of commands is only transmitted to the selected subset of training nodes and not a remainder of the training nodes in the plurality of training nodes.

16. The method of claim 15, wherein the first set of commands specify a model to be trained during the evaluation phase and a hyperparameter value for use during the evaluation phase.

17. The method of claim 16, wherein the first local training data is a subset of the second local training data, and wherein the first set of commands indicate how much of the second local training data is to be used as the first local training data.

* * * * *